(12) United States Patent
Honjo et al.

(10) Patent No.: US 8,611,739 B2
(45) Date of Patent: Dec. 17, 2013

(54) FOCUS ADJUSTING APPARATUS AND IMAGING APPARATUS

(75) Inventors: Kenichi Honjo, Osaka (JP); Mitsuyoshi Okamoto, Osaka (JP); Koji Shibuno, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/883,692

(22) Filed: Sep. 16, 2010

(65) Prior Publication Data
US 2011/0069946 A1    Mar. 24, 2011

(30) Foreign Application Priority Data

Sep. 17, 2009 (JP) ................................. 2009-215367
Sep. 17, 2009 (JP) ................................. 2009-215368

(51) Int. Cl.
*G03B 13/34* (2006.01)

(52) U.S. Cl.
USPC .......................................... 396/135; 348/349

(58) Field of Classification Search
USPC .......................................... 396/135; 348/349
See application file for complete search history.

(56) References Cited

U.S. PATENT DOCUMENTS

| | | | | |
|---|---|---|---|---|
| 4,888,609 | A | * | 12/1989 | Hamada et al. ............... 396/104 |
| 5,206,677 | A | * | 4/1993 | Onuki et al. .................... 396/82 |
| 5,448,329 | A | | 9/1995 | Nakata |
| 5,463,442 | A | * | 10/1995 | Harigaya et al. ............... 396/85 |
| 5,592,575 | A | * | 1/1997 | Nakazato ...................... 382/312 |
| 5,664,239 | A | * | 9/1997 | Nakata .......................... 396/104 |
| 2004/0056975 | A1 | * | 3/2004 | Hata .............................. 348/371 |
| 2006/0104624 | A1 | * | 5/2006 | Nakata et al. ................. 396/137 |
| 2007/0196093 | A1 | * | 8/2007 | Tanaka .......................... 396/133 |
| 2008/0030594 | A1 | * | 2/2008 | Terada ....................... 348/221.1 |

FOREIGN PATENT DOCUMENTS

| | | |
|---|---|---|
| JP | 3-150536 | 6/1991 |
| JP | 4-042674 | 2/1992 |
| JP | 4-338708 | 11/1992 |
| JP | 5-060968 | 3/1993 |
| JP | 2006-126329 | 5/2006 |
| JP | 2006-208703 | 8/2006 |
| JP | 2008-310215 | 12/2008 |
| JP | 2009-151081 | 7/2009 |

OTHER PUBLICATIONS

Translation of JP Publication No. 07-295646; Title: Servo Circuit; Inventor: Suzuki et al.; Publication Date: Nov. 10, 1995.*

* cited by examiner

*Primary Examiner* — Rodney Fuller
*Assistant Examiner* — Fang-Chi Chang
(74) *Attorney, Agent, or Firm* — Panasonic Patent Center

(57) ABSTRACT

A focus adjusting apparatus includes an optical system including a focus lens, a driver configured to move the focus lens along an optical axis of the optical system, an obtaining unit configured to periodically obtain an evaluation value of a subject image formed via the focus lens, a determining unit configured to determine a target position to which the focus lens is moved based on the evaluation value, and a controller configured to control an operation of the driver based on the determined target position. The controller controls the driver to move the focus lens at a first speed for a first period including a backlash period which is defined from start of the operation of the driver to start of an actual movement of the focus lens, and controls the driver to move the focus lens at a second speed faster than the first speed for a second period after the end of the first period.

6 Claims, 9 Drawing Sheets

Fig. 6A

| STILL IMAGE RECORDING MODE | FOCUS LENS DRIVING SPEED | CONTACT SOUND | DRIVING SOUND | EVALUATION VALUE NOISE |
|---|---|---|---|---|
| ON NORMAL DRIVING OF FOCUS LENS | 1200 | LARGE | LARGE | SMALL |
| ON BACKLASH CORRECTION DRIVING | 300~1200 | LARGE | LARGE TO SMALL | SMALL |

Fig. 6B

| MOVING IMAGE RECORDING MODE | FOCUS LENS DRIVING SPEED | CONTACT SOUND | DRIVING SOUND | EVALUATION VALUE NOISE |
|---|---|---|---|---|
| ON NORMAL DRIVING OF FOCUS LENS | 300 | LARGE | SMALL | SMALL |
| ON BACKLASH CORRECTION DRIVING | 150 | SMALL | SMALL | LARGE |

FOCUS ADJUSTING APPARATUS AND IMAGING APPARATUS

BACKGROUND

1. Technical Field

The technical field relates to a focus adjusting apparatus for automatically adjusting a focus, and more particularly to a focus adjusting apparatus having a function for correcting backlash of a lens driver. Further, the technical field relates to an imaging apparatus mounted with such a focus adjusting apparatus.

2. Related Art

In general, it is known that a lens driver for driving a focus lens and the like has backlash in digital cameras. The backlash causes an error at the time of driving a lens to a target position in a focusing operation. For this reason, the backlash should be taken into consideration to make accurate control, and various techniques that cope with the backlash are developed (for example, see JP04-042674A and JP05-060968A).

For example, before a movement of the lens for focusing on a subject is started, backlash should be corrected. For this reason, before normal driving of the lens, it may be considered to move the lens by a moving amount corresponding to the backlash with a lens driver. However, when the lens is moved in order to eliminate the backlash, a contact sound of the lens and the lens driver or a driving sound of the lens driver during the driving of the lens may occasionally occur. In recent years, a digital camera that can capture not only a still image but also a moving image has made an appearance (for example, see JP2008-42404A). When such sounds are loud at the time when such a digital camera captures a moving image, the sounds are disadvantageously recorded as noises.

Further, for a contrast detection-type autofocus (AF) operation for determining a focus position based on an evaluation value of an image captured by an imaging device such as a CMOS sensor, an accurate focus lens position is important. However, when backlash occurs, an accurate focus lens position cannot be obtained, so that a malfunction disadvantageously occurs in the focusing operation.

SUMMARY

To solve the above problem, a focus adjusting apparatus is provided which can eliminate inconvenience caused by the backlash.

In a first aspect, A focus adjusting apparatus is provided, which includes an optical system including a focus lens, a driver configured to move the focus lens along an optical axis of the optical system, an obtaining unit configured to periodically obtain an evaluation value of a subject image formed via the focus lens, a determining unit configured to determine a target position to which the focus lens is moved based on the evaluation value, and a controller configured to control an operation of the driver based on the determined target position. The controller controls the driver to move the focus lens at a first speed for a first period including a backlash period which is defined from start of the operation of the driver to start of an actual movement of the focus lens, and controls the driver to move the focus lens at a second speed faster than the first speed for a second period after the end of the first period.

With this configuration, a driving speed of the focus lens can be switched so that an optimum driving seed is achieved for each of the first period including the backlash period and the second period after the end of the first period. That is, the focus lens is driven at a low speed for the first period including the backlash period, so that the contact sound of the focus lens and the lens driver can be reduced. At the same time, the focus lens is driven at a higher speed for the second period, so that the focus lens can be moved to the target position quickly.

In a second aspect, a focus adjusting apparatus is provided, which includes an optical system including a focus lens, a driver configured to move the focus lens along an optical axis of the optical system, an obtaining unit configured to periodically obtain an evaluation value of a subject image formed via the focus lens, a determining unit configured to determine a target position to which the focus lens is moved based on the evaluation value, a controller configured to control an operation of the driver based on the determined target position, and a setting unit configured to set a reliability flag indicating a backlash period which is defined from start of the operation of the driver to start of an actual movement of the focus lens. The determining unit stops operation of determining the target position based on the evaluation value, while the reliability flag indicates the backlash period.

With this configuration, a malfunction of the focus lens driver based on an inaccurate evaluation value for the backlash period can be prevented.

In a third aspect, an imaging apparatus having the focus adjusting apparatus according to the first or second aspect is provided.

According to the above aspects, the focus adjusting apparatus is provided, which has good usability and prevents inconvenience caused by backlash correction from occurring.

BRIEF DESCRIPTION OF DRAWINGS

FIGS. 6A and 6B are diagrams for describing a relationship among a focus lens driving speed, a contact sound, a driving sound, and an evaluation value noise.

DETAILED DESCRIPTION OF PREFERRED EMBODIMENT

Preferred embodiments are described in detail below with reference to the drawings. The embodiments are described below by using a digital camera as an example.

First Embodiment

1. Configuration of Digital Camera

A configuration of a digital camera according to the first embodiment is described with reference to the drawings.

1-1. Outline

Figure 1:
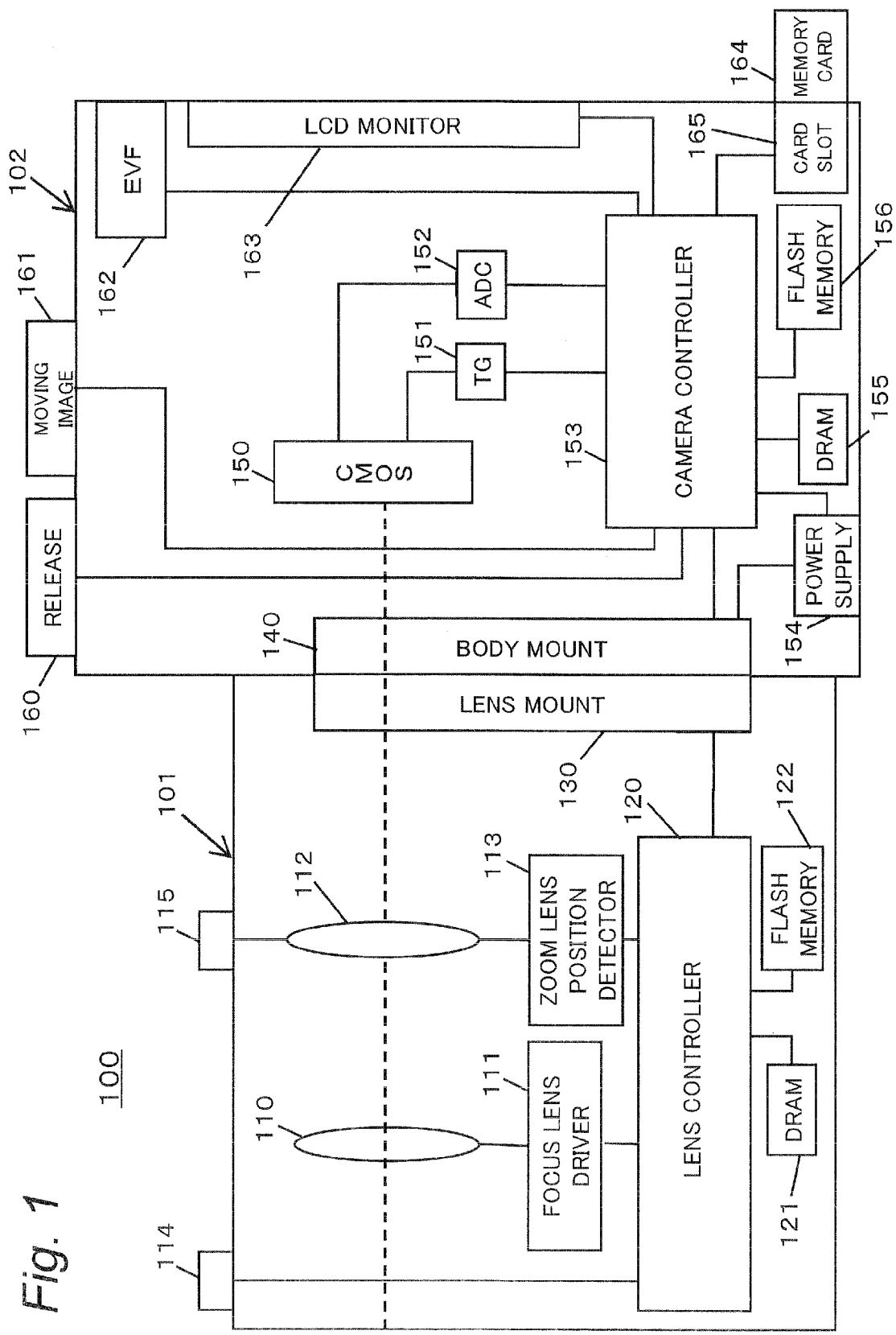
FIG. 1 is a constitutional diagram illustrating a digital camera 100 according to a first embodiment.

FIG. 1 is a block diagram illustrating an electric configuration of a digital camera 100 according to the first embodiment. The digital camera 100 includes a camera body 102 and an interchangeable lens 101 mountable to the camera body 102. The digital camera 100 can perform a contrast-type autofocus operation based on image data (contrast value) generated by a CMOS image sensor 150.

1-2. Configuration of Camera Body

The camera body 102 includes the CMOS image sensor 150, a liquid crystal display (LCD) monitor 163, an electronic viewfinder (EVF) 162, a camera controller 153, a body mount 140, a release button 160, a moving image recording button 161, a power supply 154, and card slot 165.

The camera controller 153 controls respective sections such as the CMOS image sensor 150 according to an instruction from an operating member such as the release button 160 or the moving image recording button 161, so as to control the entire operation of the digital camera 100. The camera controller 153 transmits a vertical synchronizing signal to a timing generator (TG) 151. Collaterally, the camera controller 153 generates an exposure synchronizing signal based on the vertical synchronizing signal. The camera controller 153 transmits periodically the generated exposure synchronizing signal to the lens controller 120 (described later) via the body mount 140 and a lens mount 130. The camera controller 153 uses a DRAM 155 as a work memory at the time of the control operation and the image processing operation. The camera controller 153 may be composed of a hard-wired electronic circuit, or may be composed of a microcomputer using a program. Further, the camera controller 153 may be formed in a semiconductor chip with or separately from an image processor and/or the work memory.

The CMOS image sensor 150 is an imaging device for capturing a subject image incident via the interchangeable lens 101 to generate image data. The generated image data is converted from analog-format data to digital-format data by an AD converter 152. The image data digitalized by the AD converter 152 is subjected to various image processes by the camera controller 153. The various image processes include, for example, a gamma correction, a white balance adjustment, a flaw correction, a YC conversion, an electronic zoom process, and a JPEG compression, but the processes are not limited to them. Instead of the CMOS image sensor 150, for example, another imaging device such as an NMOS image sensor or a CCD image sensor may be used. The camera controller 153 obtains a contrast value as an evaluation value for each of frames from the image data generated by the CMOS image sensor 150. The camera controller 153 executes the autofocus operation based on the respective contrast values (evaluation values) for the respective obtained frames. The autofocus operation is detailed later.

The CMOS image sensor 150 operates at timing controlled by the timing generator 151 (TG). The operation of the CMOS image sensor 150 controlled by the timing generator 151 includes a still image recording operation, an operation of capturing a through image, a data transfer operation, an electronic shutter operation, and the like. The through image is mainly a moving image, and is displayed on the LCD monitor 153 and the electronic viewfinder 162 (EVF) in order that a user determines a composition for taking a still image.

The LCD monitor 163 is arranged on a rear surface of the camera body 102 and displays an image represented by image data for display processed by the camera controller 153. The LCD monitor 163 can display selectively the moving image and the still image. Besides images, the LCD monitor 163 can display entire setting conditions of the digital camera 100 and the like. The first embodiment describes the LCD monitor 163 as one example of a display unit, but the display unit is not limited to this. For example, an organic EL display may be used as a display unit.

The electronic viewfinder 162 (EVF) is arranged on an upper rear surface of the camera body 102, and displays an image represented by image data for display processed by the camera controller 153 similarly to the LCD monitor 163.

Display on the LCD monitor 153 and the electronic viewfinder 162 (EVF) may be carried out simultaneously, or be switched to either one of them. When the simultaneous display is carried out, an image to be displayed on the LCD monitor 163 and an image to be displayed on the electronic viewfinder 162 may be same or different.

The flash memory 156 functions as an internal memory for storing image data and the like. The flash memory 156 stores programs and parameters to be used for control of the camera controller 153.

The card slot 165 is a connecting unit to which the memory card 164 is attachable. The card slot 165 can be electrically or mechanically connected to the memory card 164. Further, the card slot 165 may have a function for controlling the memory card 164.

The memory card 164 is an external memory containing a storage element such as a flash memory. The memory card 164 can store data such as image data processed by the camera controller 153. Further, the memory card 164 can output the data such as image data to be stored therein. The image data outputted from the memory card 164 is processed by the camera controller 153, and is displayed (reproduced) on the LCD monitor 163 or the like. The first embodiment describes the memory card 164 as one example of an external recording medium, but the external recording medium is not limited to this. For example, a recording medium such as an optical disc may be used as the external recording medium.

The body mount 140 can be mechanically or electrically connected to the lens mount 130 of the interchangeable lens 101. The body mount 140 enables transmission/reception of data between the camera body 102 and the interchangeable lens 101 via the lens mount 130. The body mount 140 transmits an exposure synchronizing signal and another control signal received form the camera controller 153 to the lens controller 120 via the lens mount 130. Further, the body mount 140 transmits a signal received from the lens controller 120 via the lens mount 130 to the camera controller 153.

The power supply 154 supplies power for driving the digital camera 100. The power supply 154 may be, for example, a dry battery or a rechargeable battery. As the power supply 154, power supplied from the outside via a power cord may be supplied to the digital camera 100. When the power is turned ON, the camera controller 153 supplies power to the entire camera body 102. The camera controller 153 supplies power to the interchangeable lens 101 via the body mount 140 and the lens mount 130. The lens controller 120 supplies the power received via the lens mount 130 to the entire interchangeable lens 101.

The release button 160 receives a user's operation. The release button 160 is operated at two steps including a half pressing and full pressing. When the half-pressing of the release button 160 is made by the user, the camera controller 153 executes the autofocus operation. Further, when the full-pressing of the release button 160 is made, the camera controller 153 records image data generated at the full-press operation to the memory card 164.

The moving image recording button 161 receives a user's operation. While viewing a through image displayed on the LCD monitor 163, the user can press down the moving image recording button 161 at any timing. When the moving image recording button 161 is pressed down, the camera controller 153 starts recording of the moving image data to the memory card 164 at the timing of pressing-down the button 161. While recording the moving image, the camera controller 153 continuously performs the autofocus operation. When the moving image recording button 161 is again pressed down during the recording the moving image, the camera controller 153 ends the storage of the moving image data to the memory card 164.

1-3. Configuration of Interchangeable Lens

The interchangeable lens 101 includes an optical system, a lens controller 120, and a lens mount 130. The optical system includes a focus lens 110 and a zoom lens 112. Although not shown in FIG. 1, a camera shake correction lens (image stabilizer) may be provided.

The lens controller 120 controls the entire operation of the interchangeable lens 101. The lens controller 120 may be composed of a hard-wired electronic circuit, a microcomputer using a program, or the like.

A DRAM 121 functions as a work memory to be used for controlling the lens controller 120. A flash memory 122 stores programs, parameters, and lens authentication information (described later) to be used for the control of the lens controller 120.

The zoom lens 112 is a lens for changing magnification of a subject image to be formed by the optical system of the interchangeable lens 101. A lens structure of the zoom lens 112 may be of any number of lenses or of any groups of lenses. A zoom ring 115 is provided to an outer package of the interchangeable lens 101, and transmits a rotating operation by the user to the zoom lens 112. With the rotating operation, the zoom lens 112 moves along the optical axis of the optical system. A zoom lens position detector 113 detects a position of the zoom lens 112. The lens controller 120 acquires the position of the zoom lens 112 from the zoom lens position detector 113 so as to be capable of obtain zoom magnification of the optical system. The information about the zoom magnification obtained by the lens controller 120 is transmitted to the camera controller 153 via the lens mount 130.

The focus lens 110 is a lens for changing a focus state of a subject image incident from the optical system and formed on the CMOS image sensor 150. A lens structure of the focus lens 110 may be of any number of lenses or of any groups of lenses. A focus lens driver 111 drives the focus lens 110 to cause the focus lens to advance and retreat along the optical axis of the optical system under the control of the lens controller 120. A focus ring 114 is provided to the outer package of the interchangeable lens 101. When the focus ring 114 is rotated by a user, information about an operating amount (rotation amount) of the focus ring 114 is transmitted to the lens controller 120. The lens controller 120 controls the focus lens driver 111 based on the information about the received operating amount of the focus ring 114 to drive the focus lens 110. The focus lens driver 111 can be realized by, for example, a stepping motor, a DC motor, or an ultrasonic motor.

1-4. Correspondence of Terms

The camera controller 153 is an example of an obtaining unit or a determining unit. The focus lens driver 111 is one example of a driver. The lens controller 120 is one example of a controller. The configuration including the focus lens 110, the camera controller 153, the lens controller 120 and the focus lens driver 111 is one example of the focus adjusting apparatus. The digital camera 100 is one example of the imaging apparatus.

2. Operation of Digital Camera

The operation of the digital camera 100 having the above constitution is described below.

2-1. Capturing Preparation Operation

Figure 2:
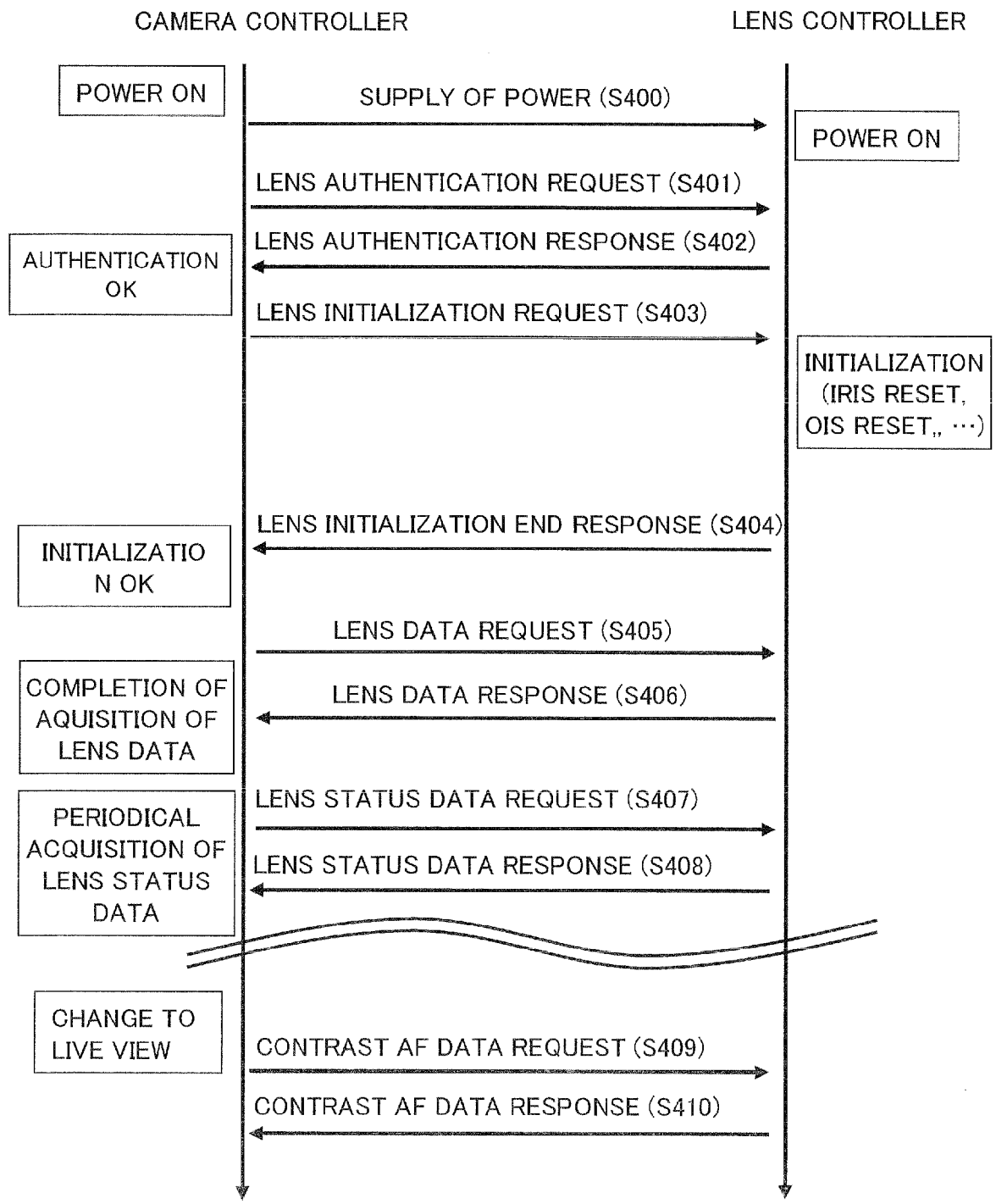
FIG. 2 is a flowchart illustrating an initial setting operation of the digital camera 100.

At first, an operation for preparing for image capturing of the digital camera 100 is described. FIG. 2 is a diagram for describing the capturing preparation operation of the digital camera 100.

When the user turns on the power supply 154 of the camera body 102 with the interchangeable lens 101 mounted to the camera body 102, the power supply 154 supplies power to the interchangeable lens 101 via the body mount 140 and the lens mount 130 (S400). The camera controller 153 requests the authentication information about the interchangeable lens 101 from the lens controller 120 (S401). The authentication information about the interchangeable lens 101 includes information about whether the interchangeable lens 101 is attached and information about whether an accessory is attached. The lens controller 120 responds to a lens authentication request form the camera controller 153 (S102).

The camera controller 153 requests the lens controller 120 to perform an initializing operation (S403). In response to this, the lens controller 120 performs the initializing operation such as resetting of a diaphragm (not shown) or resetting of an OIS lens (not shown). The lens controller 120 returns information about the completion of the lens initializing operation to the camera controller 153 (S404).

The camera controller 153 requests lens data from the lens controller 120 (S405). The lens data is stored in the flash memory 122. The lens controller 120 reads the lens data from the flash memory 122, and transmits it to the camera controller 153 (S406). The lens data is a characteristic value specific to the interchangeable lens 101 such as a lens name, an F number and a focus distance.

When the camera controller 153 recognizes the lens data about the interchangeable lens 101 mounted to the camera body 102, the digital camera 100 becomes in a state capable of capturing an image. In this state, the camera controller 153 periodically requests lens state data representing the state of the interchangeable lens 101 from the lens controller 120 (S407). The lens state data includes, for example, zoom magnification information about the zoom lens 112, position information about the focus lens 110 and aperture value information. In response to this request, the lens controller 120 transmits the requested lens state data to the camera controller 153 (S408).

In this state, the digital camera 100 can operate in a control mode for displaying an image represented by image data generated by the CMOS image sensor 150 as a through image on the LCD monitor 163. This control mode is called a "live view mode". In the live view mode, since the through image is displayed as a moving image on the LCD monitor 163, the user can determine a composition for taking a still image while viewing the LCD monitor 163. The user can select whether the live view mode is set. A control mode other than the live view mode to be selected by the user includes a control mode for guiding a subject image from the interchangeable lens 101 to the electronic viewfinder (EVF). As a method of the autofocus operation in the live view mode, a contrast detection method is suitable. This is because the CMOS image sensor 150 continuously generates image data in the live view mode so that the autofocus operation of a contrast detection method using the image data is made easy.

When the autofocus operation in the contrast detection method is performed, the camera controller 153 requests data for contrast AF from the lens controller 120 (S409). The data for contrast AF is data necessary for the autofocus operation in the contrast detection method, and includes, for example, a focus lens driving speed, a focus shift amount, an image magnification, and a contrast AF availability information. In response to this request, the lens controller 120 returns the requested data for contrast AF to the camera controller 153 (S410).

The digital camera 100 performs the capturing preparation operation in the above manner. The digital camera 100 performs the autofocus operation according to the contrast detection method. A so-called hill-climbing autofocus operation is described later.

2-2. Backlash Correction Operation

In a driving system mechanism to be driven by a motor, a mechanical gap having directionality called "backlash" frequently occurs. When such backlash occurs in the driving system of the focus lens 110, it is difficult to recognize an accurate stop position of the focus lens 110 to prevent high-accuracy focusing. For this reason, the lens controller 120 should correct the backlash between the focus lens 110 and the focus lens driver 111 when driving the focus lens 110.

The backlash correction operation differs between a case where the focus lens 110 starts to move from the stop position to a direction same as the moving direction before the stop (hereinafter, referred to as a "forward direction") and a case where it starts to move from the stop position to a direction opposite to the moving direction before the stop (hereinafter, referred to as a "reverse direction").

The backlash occurs on both sides of contact points between the focus lens 110 and the focus lens driver 111. When the focus lens 110 moves from the stop position in the forward direction, the backlash at the contact point between the focus lens 110 and the focus lens driver 111 at the time of movement before the stop becomes a problem. Further, when the focus lens 110 moves in the reverse direction, the backlash at the contact point opposite to the contact point between the focus lens 110 and the focus lens driver 111 at the time of movement before the reversal becomes a problem.

The backlash correction operations for the movement of the focus lens 110 in the forward and reverse directions are described below with reference to FIGS. 3A to 4C.

Figure 3A:
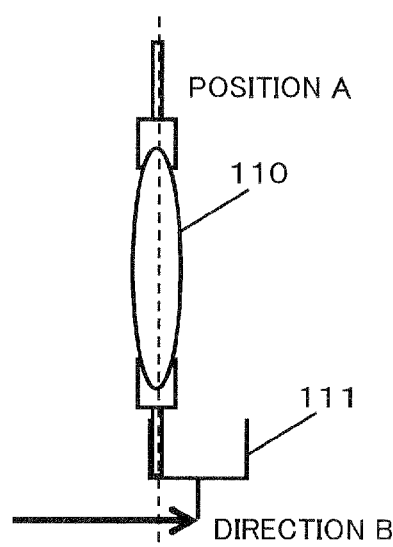
FIGS. 3A to 3C are diagrams for explaining backlash correction for movement of a lens in a forward direction.
Figure 3B:
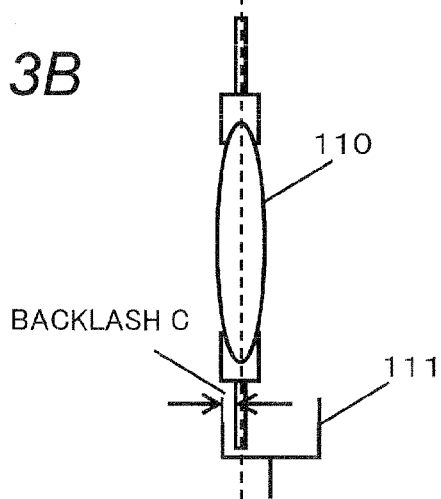
Figure 3C:
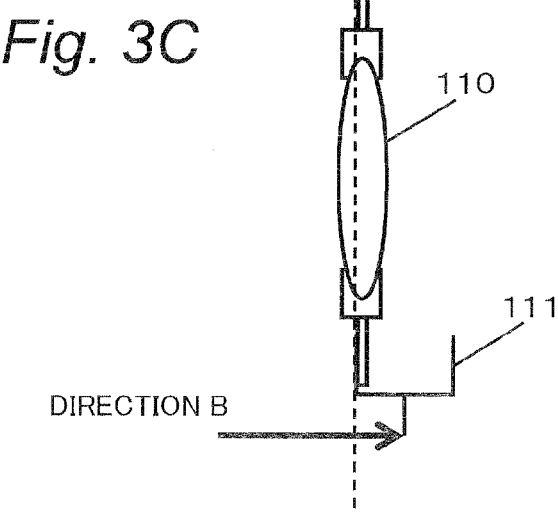

FIGS. 3A to 3C are diagrams for describing the backlash correction at the time of the forward direction movement. FIGS. 3A to 3C schematically illustrate a position relationship between the focus lens 110 and the focus lens driver 111. In FIGS. 3A to 3C, a position A is a temporary stop position of the focus lens 110. Further, direction B is a driving direction of the focus lens 110.

FIG. 3A is a diagram showing a state when the focus lens 110 moving to the direction B by the focus lens driver 111 reaches the position A. At this time, backlash is not present at the contact point between the focus lens 110 and the focus lens driver 111. After the focus lens 110 stops at the position A, backlash (gap) C may occasionally occur between the focus lens 110 and the focus lens driver 111 as shown in FIG. 3B due to a weight of the focus lens 110, external impact, or the like. With the backlash C, even though the focus lens driver 111 starts an operation to move the focus lens 110 to the direction B, the focus lens 110 does not start to move until the focus lens driver 111 moves by the backlash C. That is, after the focus lens driver 111 starts the operation and moves by the backlash C, the focus lens 110 starts to move. Such a period, caused by the backlash, from start of the operation of the focus lens driver 111 until the focus lens 110 actually moves is called "a backlash period".

In the first embodiment, as shown in FIG. 3C, before normal lens driving, the focus lens 110 is moved in the forward direction (direction B), so that the backlash C is corrected (eliminated). The backlash C generally varies according to the individual digital cameras 100. For this reason, a value relating to the backlash C is measured at the time of manufacturing the digital camera 100 and is stored in the flash memory 122 of the interchangeable lens 101.

The lens controller 120 transmits a driving control signal for correcting the backlash C to the focus lens driver 111 based on a value relating to the backlash C stored in the flash memory 122. For example, when the focus driver 111 is composed of a stepping motor and 300 steps are required for correcting the backlash C, the lens controller 120 transmits a control signal for instructing the driving for 300 steps to the focus driver 111. The same holds true for a case where another motor such as a DC motor or an ultrasonic motor is applied to the focus lens driver 111. After the backlash C is corrected, the focus lens driver 111 drives the focus lens 110 to a next target position.

Figure 4A:
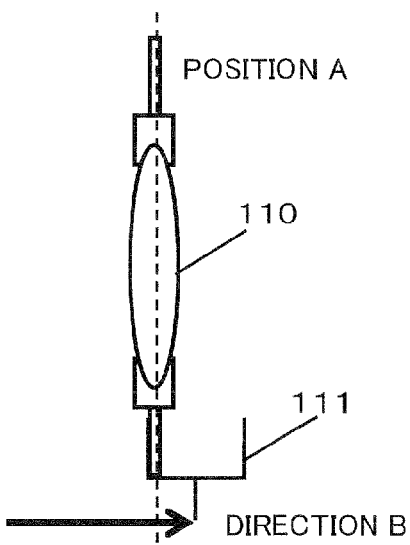
FIGS. 4A to 4C are diagrams for explaining the backlash correction for inverted movement of a lens.
Figure 4B:
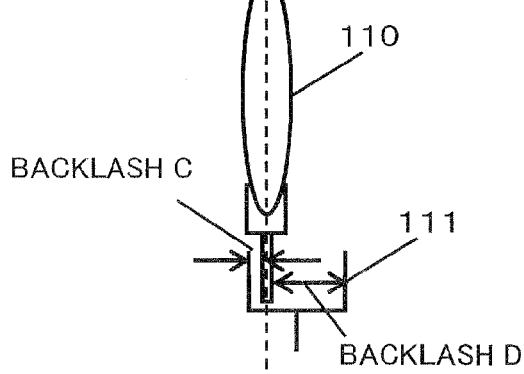
Figure 4C:
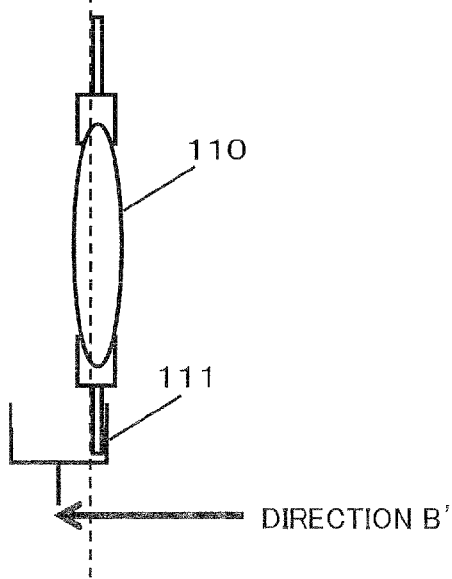

The backlash correction for the reverse direction movement is described below. FIGS. 4A to 4C are diagrams for describing the backlash correction for the reverse direction movement. FIGS. 4A to 4C schematically illustrate the position relationship between the focus lens 110 and the focus lens driver 111. In FIGS. 4A to 4C, the position A is a temporary stop position of the focus lens 110. Further, the direction B is a driving direction of the focus lens 110 before the temporary stop, and a direction B' is a driving direction of the focus lens 110 after the temporary stop.

FIG. 4A is a diagram showing a state when the focus lens 110 moving in the direction B by the focus lens driver 111 reaches the position A. At this time, no backlash is present at the contact point between the focus lens 110 and the focus lens driver 111. After the focus lens 110 stops at the position A, the backlash C may occasionally occur between the focus lens 110 and the focus lens driver 111 as shown in FIG. 4B due to the weight of the focus lens 110, external impact, or the like. When the focus lens 111 reverses from the state of stopping at the position A, not the backlash C but backlash D present in the reverse direction becomes a problem (see FIG. 4B).

In this embodiment, as shown in FIG. 4C, the focus lens 110 is moved in the reverse direction to correct the backlash D. Similarly to the backlash C, the backlash D generally varies according to the individual digital cameras 100. Hence, the value relating to the backlash D is measured at the time of manufacturing the digital camera 100, and is stored in the flash memory 122 of the interchangeable lens 101. The lens controller 120 transmits a driving control signal for correcting the backlash D to the focus lens driver 111 based on the value relating to the backlash D stored in the flash memory 122. For example, when the focus driver 111 is composed of a stepping motor and 500 steps are required for correcting the backlash D, the lens controller 120 transmits a control signal for instructing the driving for 500 steps to the focus driver 111. The same holds true for a case where another motor such as a DC motor or an ultrasonic motor is applied to the focus lens driver 111. After the correction of the backlash D, the focus lens driver 111 drives the focus lens 110 to a next target position.

2-3. Autofocus Operation

The digital camera 100 performs the autofocus operation according to the contrast detection method. The so-called hill-climbing autofocus operation of the digital camera 100, and a case where the hill-climbing autofocus operation malfunctions are described below.

2-3-1. Hill-Climbing Autofocus Operation

Figure 5:
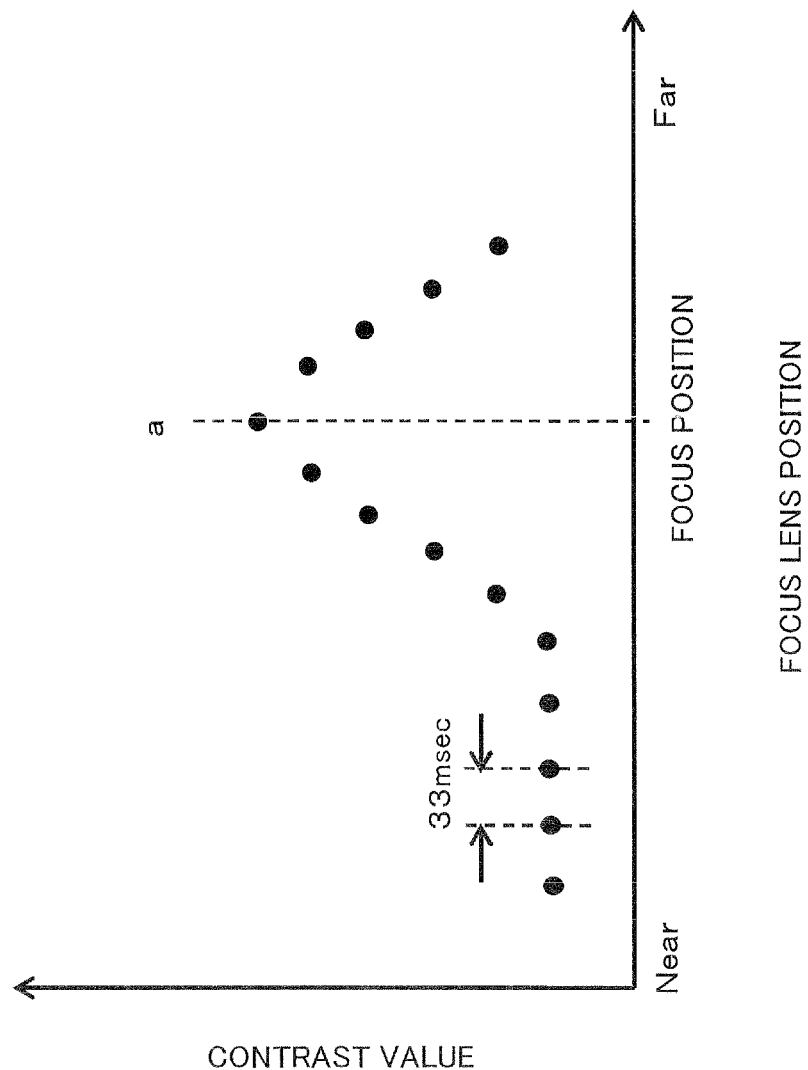
FIG. 5 is a diagram for describing a hill-climbing AF operation.

FIG. 5 is a diagram for describing the hill-climbing autofocus operation. The hill-climbing autofocus operation includes detecting a position of the focus lens 110 at which a maximum contrast value can be obtained as a focus position from image data generated by the CMOS image sensor 150 based on contrast values obtained for respective frames, and moving the focus lens to the detected position. In FIG. 5, a vertical axis represents the contrast value obtained for each frame and a horizontal axis represents the position of the focus lens 110.

The user sets a composition, an exposure condition, and the like while viewing a through image displayed on the LCD monitor 163, and then half-presses the release button 160. When the camera controller 153 receives the half-press operation of the release button 160, the focus lens 110 is moved from the current position to a side of the CMOS image sensor (Near side) by a predetermined distance. Thereafter, the camera controller 153 drives the focus lens 110 to a subject side (Far side). When a frame interval by which the CMOS image sensor 150 generates image data is, for example, 33 msec (1 sec/30 frames), the camera controller 153 obtains a contrast value at each 33 msec. The camera controller 153, while obtaining the contrast value from the image data generated by the CMOS image sensor 150, drives the focus lens 110.

As shown in FIG. 5, as the position of the focus lens 110 is closer from the Near end to the focus position, the obtained contrast value becomes larger. When the position of the focus lens 110 passes the position of the focus lens 110 at which the contrast value becomes a peak (position "a"), the contrast value reduces. The camera controller 153 monitors whether the obtained contrast value becomes larger, passes the peak, and reduces. When the focus lens 110 passes the focus position "a", the obtained contrast value reduces. When the obtained contrast value passes the peak and reduces, the camera controller 153 moves the focus lens 110 to return to the position "a" at which the contrast value becomes the peak.

As described above, when receiving the half-press operation of the release button 160, the camera controller 153 performs the auto focus operation.

2-3-2. Focus Lens Driving Speed in Recording Still Images and Moving Images.

The focus lens driving speeds in recording still images and moving images are described with reference to FIGS. 6A and 6B. FIG. 6A illustrates a relationship among the focus lens driving speed (motor pulse count), a contact sound, a driving sound, and a contrast evaluation value noise (hereinafter, referred to as a "evaluation value noise"), in the still image recording mode. FIG. 6B illustrates a relationship among the focus lens driving speed (motor pulse count), a contact sound, a driving sound, and an evaluation value noise, in the moving image recording mode.

In FIGS. 6A and 6B, the "focus lens driving speed" is represented by a pulse count per second as an example where the focus lens driver 111 is a stepping motor. "The contact sound" represents a level of a sound generated by contact of the focus lens 110 and the focus lens driver 111 when the focus lens 111 is driven at the corresponding driving speed. "The driving sound" represents a level of a sound generated by the focus lens driver 111 when the focus lens 111 is driven at the corresponding driving speed. "The evaluation value noise" represents a level of a noise included in the obtained contrast evaluation value (namely, a level of an influence on the autofocus operation).

At first, the focus lens driving speed the still image recording mode is described with reference to FIG. 6A. In the still image recording mode, different focus lens driving speeds are set between the normal driving and the backlash correction driving of the focus lens 110.

At the time of the normal driving of the focus lens 110, the lens controller 120 controls the focus lens driver 111 so that it is driven at a high speed, namely, 1200 pulse/sec. The focus lens 110 is driven at such a high speed, and thus the contact sound and the driving sound become loud. However an attention does not have to be paid to the levels of the contact sound and the driving sound, since a still image is captured and a sound is not recorded. At this time, the evaluation value noise is low, and thus the camera controller 153 can perform the accurate autofocus operation.

At the time of the backlash correction driving of the focus lens 110, the lens controller 120 controls the focus lens driver 111 so that it is driven at 300 to 1200 pulse/sec. When the target position (focus point position) is known, the focus lens driving speed at the time of the backlash correction driving in the still image recording mode is set to the highest speed (1200 pulse/sec). When the target position (focus point position) is searched, the focus lens driving speed may occasionally be set to a lower speed. At this time, the contact sound becomes loud, but an attention does not have to be paid to the level of the contact sound because the still image is recorded. Further, the driving sound changes according to the driving speed, but since a still image is recorded and the sound is not recorded, the level of the driving sound does not have to be taken into consideration. At this time, the evaluation value noise is low, so that the accurate autofocus operation can be performed.

The focus lens driving speed in the moving image recording mode is described below with reference to FIG. 6B. In the moving image recording mode, different focus lens driving speeds are set between the normal driving and the backlash correction driving of the focus lens 110.

At the time of the normal driving of the focus lens 110, the lens controller 120 controls the focus lens driver 111 so that it is driven at a low speed, namely, 300 pulse/sec. When the focus lens driver 111 is driven at the low speed, an influence of the contact sound becomes louder. But after the backlash correction, the focus lens 110 already contacts the focus lens driver 111, and thus another contact does not occur during the driving. As a result, the contact sound does not have to be taken into consideration. On the other hand, the driving sound and the evaluation value noise are low. Therefore, the digital camera 100 can perform the accurate autofocus operation while realizing silent sound driving.

At the time of the backlash correction driving in the moving image recording mode, the lens controller 120 controls the focus lens driver 111 so that it is driven at an ultralow speed, namely, 150 pulse/sec. Since the focus lens 110 is driven at the ultralow speed, although the contact sound and the driving sound are low, the evaluation value noise becomes loud.

As described above, the digital camera 100 changes the driving speed of the focus lens 110 between the still image recording mode and the moving image recording mode. In the still image recording mode, it is desirable that the focus lens 110 reaches the focus position as fast as possible. Further, a still image is recorded, and thus the contact sound and the driving sound at the time of driving the focus lens 110 does not have to be taken into consideration. For this reason, in the still image recording mode, the lens controller 120 controls the focus lens driver 111 to move the focus lens 110 at a high speed. On the other hand, in the moving image recording mode, since a sound is also recorded, it is desirable that the sound is as low as possible. Further, it is not preferable that a change in image magnification during the recording of moving images is large. For this reason, in the moving image recording mode, the lens controller 120 controls the focus lens driver 111 to move the focus lens 110 at a low speed.

In the digital camera 100, the driving speed in the normal driving (namely, the moving speed of the focus lens 110 after the backlash correction) is set to be faster than the driving speed in the backlash correction in the still and moving image recording modes. The reason for this control is described below.

Figure 7A:
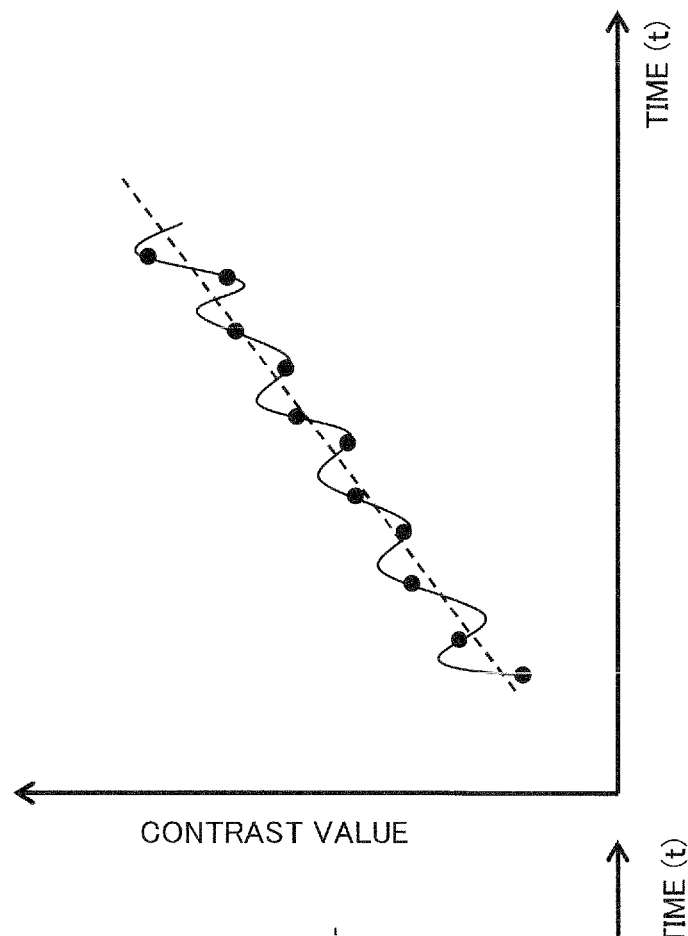
FIGS. 7A and 7B are diagrams for describing a relationship between the evaluation value noise and the focus lens driving speed.
Figure 7B:
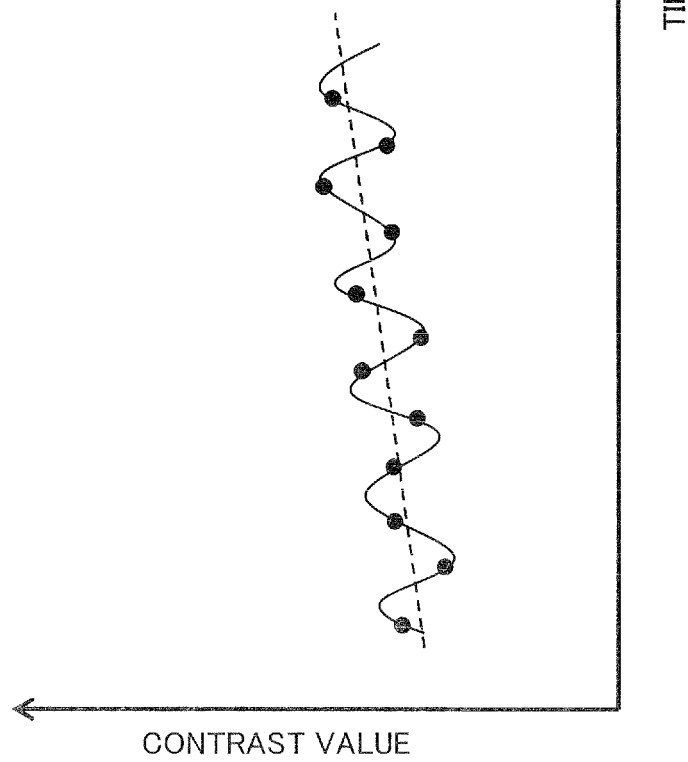

A relationship between the evaluation value noise and the focus lens driving speed is described with reference to FIGS. 7A and 7B. FIG. 7A is a diagram describing the evaluation value noise when the driving speed of the focus lens 110 is low. FIG. 7B is a diagram describing the evaluation value noise when the driving speed of the focus lens 110 is high.

Figure 8:
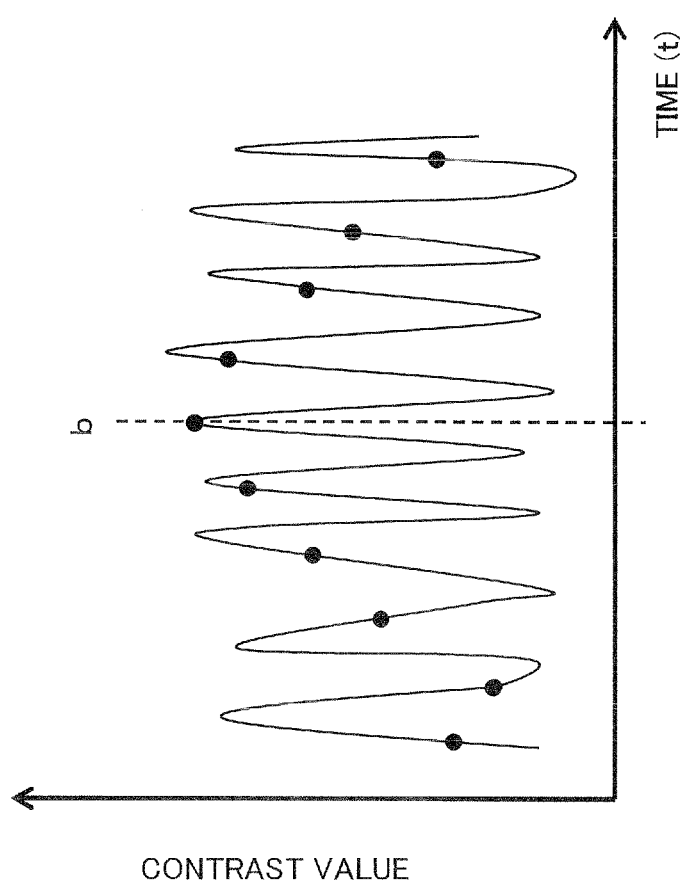
FIG. 8 is a diagram for describing a malfunction of the hill-climbing AF operation.

As shown in FIG. 7A, when the focus lens 110 is driven at a low speed, a gradient of the contrast value per unit time becomes gentle. For this reason, in the autofocus operation of the contrast detection method, an influence of a change in the evaluation value noise to be superimposed on the contrast value becomes larger than a substantial change in the contrast value to be obtained. In the case where the influence of the evaluation value noise is large, as shown in FIG. 8, although the obtained contrast evaluation value does not substantially change, the camera controller 153 happens to determine the peak of the contrast evaluation value. That is, the camera controller 153 detects that the contrast value at a position that is not actually the focus position is a peak value to erroneously determine the focus position. As a result, the malfunction of the autofocus operation occurs. In order to avoid this problem, the digital camera 100 according to the first embodiment uses a reliability flag. Details of the reliability flag are described later.

On the other hand, as shown in FIG. 7B, when the focus lens 110 is driven at a high speed, the gradient of the contrast value per unit time becomes large. For this reason, in the autofocus operation of the contrast detection method, a substantial change in the obtained contrast value becomes larger than the evaluation value noise. For this reason, the above erroneous determination of the focus position hardly occurs.

In the first embodiment, as described above, the driving speeds of the focus lens 110 are different between the normal driving and the backlash correction of the focus lens 110. Since the backlash between the focus lens 110 and the focus lens driver 111 is not necessary, it is desired to correct the backlash as fast as possible. However, since the silent driving is desired at the recording of moving images, it is desired that the focus lens driving speed is controlled to a low speed at the normal driving. On the other hand, since the contrast value is not necessary at the backlash correction driving, the increase in the evaluation value noise due to the reduction in the focus lens driving speed is not a problem. Therefore, according to the present embodiment, in the moving image recording mode, the focus lens 110 is driven at a low speed such that the evaluation value noise does not become loud while the silent driving is being realized, during the normal driving. On the other hand, during the backlash correction driving, in order to securely realize the silent driving, the focus lens 110 is driven at a speed lower than that in the normal driving (ultralow speed). For this reason, in the backlash correction driving, the obtained contrast value is prevented from being evaluated, with reference to the reliability flag (details are described later).

As described above, in the digital camera 100 according to the first embodiment, optimum driving speeds of the focus lens are set respectively for the backlash correction driving and the normal driving. As a result, while the silent driving is being realized, the influence of the evaluation value noise can be reduced, and thus the accurate autofocus operation can be performed.

2-3-3. Reliability Flag

The reliability flag is used for the camera controller 153 to determine whether the obtained contrast value can be trusted. For example, when the reliability flag shows "0", the determination is made that the obtained contrast value cannot be trusted, and when "1", the determination is made that the obtained contrast value can be trusted. In the following description, transmitting the reliability flag "0" refers to setting the reliability flag to OFF, and transmitting the reliability flag "1" refers to setting the reliability flag to ON. The reliability flag is set by the lens controller 120, and is transmitted to the camera controller 153. Before the backlash correction operation is started in the moving image recording mode, the lens controller 120 sets the reliability flag to "0", and after the backlash correction operation is ended in the moving image recording node, the reliability flag is set to "1".

2-3-4. Process Using Reliability Flag

Figure 9:
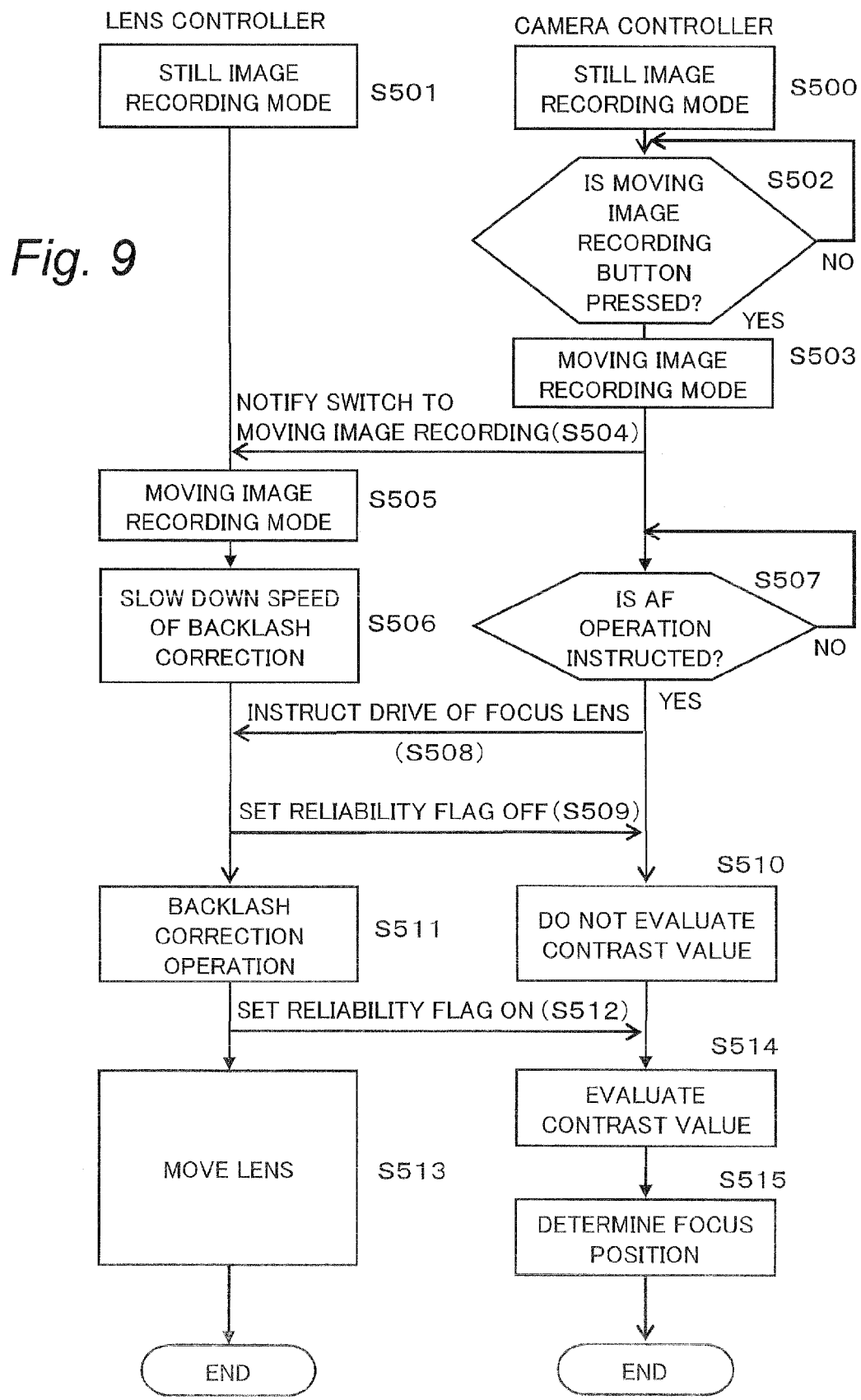
FIG. 9 is a flowchart illustrating an operation of the digital camera 100 according to the first embodiment.

A process for avoiding a malfunction of the autofocus operation while realizing the low-speed driving at the backlash correction in the recording of moving images using the reliability flag is described, with reference to FIG. 9.

First, the digital camera 100 is set to the still image recording mode. When the still image recording mode is set in the camera body 102 (S500), the camera controller 153 informs the lens controller 120 of the setting, and the still image recording mode is set also on the side of the interchangeable lens 101 (S501). At this time, the driving speed of the focus lens 110 and the driving speed of the backlash correction are set with values for the still image recording mode.

The camera controller 153 monitors whether the moving image recording button 161 is pressed down by the user (S502). When the moving image recording button 161 is pressed down in the still image recording mode, the camera controller 153 sets the camera body 102 into the moving image recording mode (S503). The camera controller 153 informs the lens controller 120 that the moving image recording mode is set (S504).

In response to this information, the lens controller 120 sets the interchangeable lens 101 into the moving image recording mode (S505). At this time, the driving speed of the focus lens 110 and the driving speed of the backlash correction are set with values for the moving image recording mode (S506). As described above, the driving speed of the backlash correction at the recording of moving images is set to be slower than the driving speed at the recording of still images or a frame rate of image data.

Subsequently, the camera controller 153 monitors whether the autofocus operation is instructed (S507). The instruction of the autofocus operation includes an instruction based on a user's operation of the release button 160 and an instruction based on a change in the focus state of a subject. When the autofocus operation is instructed, the camera controller 153 transmits the instruction for driving the focus lens to the lens controller 120 (S508).

When the lens controller 120 receives the instruction for driving the focus lens, it transmits the reliability flag to the camera controller 153 (S509). That is, the lens controller 120 turns off the reliability flag at step S509 (the contrast value is not reliable).

After the lens controller 120 turns off the reliability flag, it performs the backlash correction operation on the focus lens 110 and the focus lens driver 111 (S511). The camera controller 153 refers to the reliability flag. When the reliability flag is OFF, the camera controller 153 does not use the contrast value obtained during the backlash correction as an evaluation value for determining the focus position (S510).

As described above, in the moving image recording mode, the backlash correction is made for a longer period than the period for the backlash correction and the frame interval of the image data in the still image recording mode. Therefore, there is a possibility that the camera controller 153 may erroneously detect the peak of the contrast value. In the present embodiment, the camera controller 153 does not use the contrast value obtained during the backlash correction for the determination of the focus position (S510). As a result, the peak of the contrast value, namely, the erroneous determination of the focus position can be avoided.

When the backlash correction is ended, the lens controller 120 sets the reliability flag on (S512). The lens controller 120 starts to move the focus lens 110 with the focus lens driver 111 in order to determine the focus position (S513). That is, the above-described hill-climbing autofocus operation is started. At this time, the camera controller 153 evaluates the contrast value to be obtained (S514). When detecting the position to be the peak of the contrast value, the camera controller 153 determines the detected position as the focus position (S515).

As described above, the digital camera 100 sets the reliability flag off during the backlash correction in the moving image recording mode, and does not use the obtained contrast value for the determination of the focus position. As a result, particularly in the recording of moving images, the digital camera 100 can realize the low-speed driving of the focus lens for silent driving without causing the problem due to the backlash correction.

In particular, an idea of the present embodiment is effective when a heavy-weighted lens is driven. In order to drive the heavy-weighted lens, a plurality of gears are used for low-speed driving so that a torque is raised. Backlash is stored by the increase in the number of gears to be used, and thus influence of the backlash becomes large. Even in such a case, the digital camera 100 sets the reliability flag off during the backlash correction, and does not use the obtained contrast value for the determination of the focus position. Hence, the digital camera 100 can perform the accurate autofocus operation.

In recording of the moving images and still images, regarding setting of the driving speed of the focus lens driver 111, the driving speed is set so that the focus lens driver 111 corrects backlash, for a time longer than a cycle with which the contrast value is obtained at recording of moving images, and for a time shorter than the cycle at recording of still images. As a result, the digital camera 100 drives the focus lens 110 at a high speed at recording still images, and drives the focus lens 110 at a low speed at recording moving images.

3. Conclusion

The digital camera 100 according to the first embodiment includes the optical system containing the focus lens 110, the focus lens driver 111 for moving the focus lens 110 along the optical axis of the optical system, the camera controller 153 periodically obtains an evaluation value of a subject image formed via the focus lens 110, the camera controller 153 for determining a target position to which the focus lens 110 moves based on the evaluation value, and the lens controller 120 for controlling the operation of the focus lens driver 111 based on the determined target position. The lens controller 120 controls the focus lens driver 111 to move the focus lens 110 at a first speed for a first period including the backlash period which is defined from the start of the operation of the focus lens driver 111 to the start of the actual movement of the focus lens 110. The lens controller 120 controls the focus lens driver 111 to move the focus lens 110 at a second speed faster than the first speed for a second period after the end of the first period. With such a constitution, the digital camera 100 can switch the driving speed of the focus lens 110 so that the driving speed becomes optimum respectively for the first period including the backlash period and the second period after the end of the first period.

The digital camera 100 according to the present embodiment includes the optical system including the focus lens 110, the focus lens driver 111 for moving the focus lens 110 along the optical axis of the optical system, the camera controller 153 for periodically obtaining an evaluation value of a subject image formed via the focus lens 110, the camera controller 153 for determining a target position to which the focus lens 110 moves based on the evaluation value, the lens controller 120 for controlling the operation of the focus lens driver 111 based on the determined target position, the lens controller 120 for setting the reliability flag indicating the backlash period defined from the start of the operation of the focus lens driver 111 to the start of the actual movement of the focus lens 110. The lens controller 120 stops the operation for determining the target position based on the evaluation value while the reliability flag indicates the backlash period. With such a constitution, the digital camera 100 can prevent a malfunction of the focus lens driver 111 based on an inaccurate evaluation value at the backlash period.

4. Other Embodiments

The above example describes the case where the hill-climbing autofocus operation is performed in both the recording of still images and the recording of moving images, but the autofocus operation is not limited to this. That is, the hill-climbing autofocus operation may be performed at the recording of still images according to pressing of the release button, and a continuous autofocus operation may be performed at the recording of moving images. Also in this case, it goes without saying that the speed of the backlash correction at the recording of moving images is set to be lower than that in the still image recording mode or the frame rate of the image data.

The above example describes the case where the contrast value obtained when the reliability flag is off is not evaluated for the determination of the focus position, but the process based on the reliability flag is not limited to this. That is, when the reliability flag is off, the contrast value may not be obtained. In other words, the digital camera 100 according to the embodiment does not determine a focus position based on the contrast value obtained for the period corresponding to the backlash correction.

In the above example, after the backlash correction is ended, the lens controller 120 sets the reliability flag on, but the method for changing the reliability flag is not limited to this. That is, the lens controller 120 may estimate timing at which the backlash correction is ended, and set the reliability flag on earlier by a cycle at which the camera controller 153 obtains the contrast value. In other words, the digital camera 100 according to this embodiment does not determine a focus position based on the contrast value obtained for the period corresponding to the backlash correction.

In the above example, the driving speed of the focus lens driver 111 is heightened when the focus lens 110 is started to move after the backlash correction is ended, but the method for changing the driving speed is not limited to this. That is, the lens controller 120 may estimate the timing at which the backlash correction is ended and heighten the driving speed of the focus lens driver 111 earlier by a cycle at which the camera controller 153 obtains the contrast value. In other words, during the backlash correction driving, the timing, at which the backlash correction driving is changed to the normal driving for determining the focus position based on the obtained contrast value, may be estimated and the driving speed of the focus lens driver 111 may be heightened.

The above example describes the case of the digital camera 100 composed of the interchangeable lens 101 and the camera body 102, but the configuration of the digital camera is not limited to this. That is, the idea of the embodiment can be applied to even a camera in which a lens is integral with a body.

The above example describes the digital camera as one example of an imaging apparatus, but the idea of the embodiment can be applied to a focus adjusting apparatus to be used in an imaging apparatus such as a movie camera or a mobile phone with a camera.

INDUSTRIAL APPLICABILITY

The aforementioned embodiment is useful for a focus adjusting apparatuses to be used in an imaging apparatuses such as a digital camera, a movie camera, or a mobile phone with a camera.

What is claimed is:

1. A focus adjusting apparatus comprising:
an optical system including a focus lens;
a driver configured to move the focus lens along an optical axis of the optical system;
an obtaining unit configured to periodically obtain an evaluation value of a subject image formed via the focus lens;
a determining unit configured to determine a target position to which the focus lens is moved based on the evaluation value; and
a controller configured to control an operation of the driver based on the determined target position,
wherein during a moving image recording in which sound is recorded as well as an moving image, the controller controls the driver to move the focus lens at a first speed for a first period including a backlash period which is defined from start of the operation of the driver to start of an actual movement of the focus lens, and controls the driver to move the focus lens at a second speed faster than the first speed for a second period after the end of the first period; and
wherein the first speed is a predetermined speed for minimizing or eliminating a contact sound of the driver and the focus lens during the backlash period, or for minimizing or eliminating a driving sound of the driver during the backlash period.

2. The focus adjusting apparatus according to claim 1, wherein the controller sets the first speed and the second speed at recording a moving image to slower than those at recording a still image.

3. The focus adjusting apparatus according to claim 1, further comprising:
a setting unit configured to set a reliability flag indicating a backlash period which is defined from start of the operation of the driver to start of an actual movement of the focus lens,
wherein the determining unit does not perform operation of determining the target position based on the evaluation value, while the reliability flag indicates the backlash period, and
after the reliability flag becomes not to indicate the backlash period, the determining unit starts the operation of determining the target position based on the evaluation value.

4. The focus adjusting apparatus according to claim 3, wherein the setting unit estimates end of the backlash period and sets the reliability flag before actual end of the backlash period.

5. The focus adjusting apparatus according to claim 3, wherein the determining unit determines the target position based on a peak value of the evaluation value, and stops the operation for determining the target position based on the peak value of the evaluation value while the reliability flag indicates the backlash period.

6. An imaging apparatus comprising the focus adjusting apparatus according to claim 1.

* * * * *